United States Patent
Schwer et al.

[15] 3,655,442
[45] Apr. 11, 1972

[54] METHOD OF MAKING SUGAR AND SUGAR PRODUCTS

[72] Inventors: Frederick W. Schwer, Orinda; Chester E. Kean, Lafayette, both of Calif.

[73] Assignee: California and Hawaiian Sugar Company

[22] Filed: Aug. 27, 1969

[21] Appl. No.: 853,361

[52] U.S. Cl. ............................. 127/58, 99/DIG. 4, 127/62, 127/63
[51] Int. Cl. ........................................................ C13f 1/02
[58] Field of Search ...................... 127/29, 30, 58, 63, 69, 62; 99/DIG. 4

[56] References Cited

UNITED STATES PATENTS

| | | | |
|---|---|---|---|
| 2,098,604 | 11/1937 | Whymper | 127/30 |
| 2,400,292 | 5/1946 | Dalton | 127/30 |
| 2,824,808 | 2/1958 | Gillett et al. | 99/DIG. 4 |
| 3,194,682 | 7/1965 | Tippens et al. | 127/30 |
| 3,212,908 | 10/1965 | Childs et al. | 127/63 X |
| 3,257,236 | 6/1966 | Schwer et al. | 127/30 X |
| 3,447,962 | 6/1969 | Megolden | 127/63 |

OTHER PUBLICATIONS

"Agglomeration," Chemical Engineering, pp. 161–168 (Oct. 1951)

Primary Examiner—Morris O. Wolk
Assistant Examiner—Sidney Marantz
Attorney—Eckhoff and Hoppe

[57] ABSTRACT

Process of making sugar and products containing predominantly sugar wherein sugar syrups are evaporated and then beaten to make a fondant-like material by a process wherein the crystallized product is screened to produce an intermediate, salable, fraction of the desired particle size, a coarse material (scalpings) and a fine material. The fine material is pelletized and combined with the coarse material and passed through a comminutor and the comminuted product is returned to the screening stage. This produces a product having a particle size distribution within a narrow range which is free flowing and in practically 100 percent yield.

3 Claims, 1 Drawing Figure

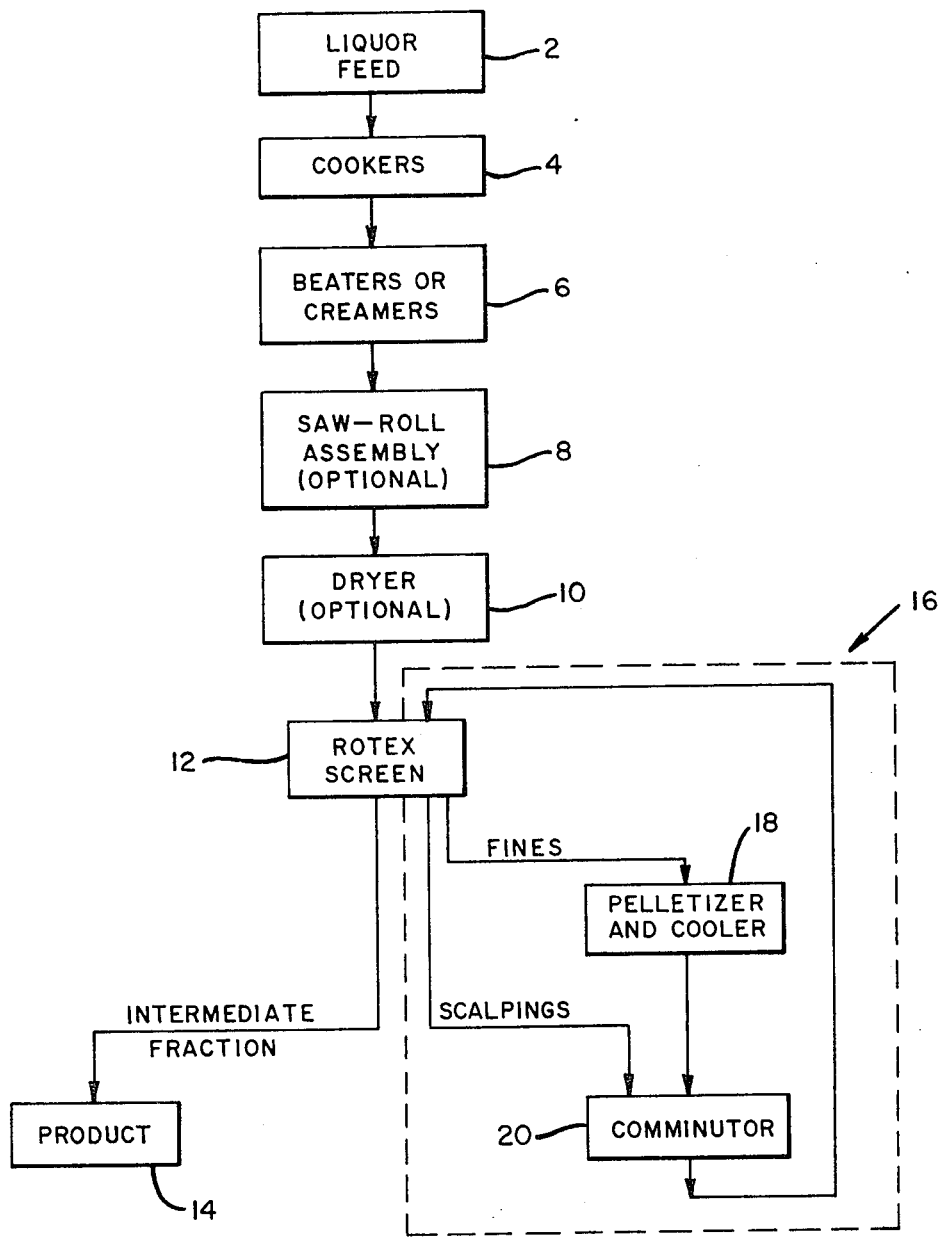

METHOD OF MAKING SUGAR AND SUGAR PRODUCTS

SUMMARY OF THE INVENTION

It is known to produce products which are composed essentially of sucrose by evaporating a sugar syrup and then passing the sugar syrup through a beater or creamer whereupon it crystallizes into granular aggregates of dried fondant. The sugar syrup may be essentially pure sucrose of it can contain other naturally occuring substances or additives. Thus the process lends itself for producing products from white sugar of 100 percent purity (on a solids basis) to brown sugar which contains as little as 85 percent sugar, the balance being naturally occuring substances derived from sugar cane which gives the brown sugar its characteristic color and taste.

Also in accordance with the present invention, other additives may be present such as corn syrup solids and dextrine which can be employed up to the extent of 30 percent. Dextrose can be incorporated in the mixture up to 15 percent. Other materials can be added such as minerals like sodium orthophosphate, sodium hydrogen phosphate and sodium dihydrogen phosphate, coloring, vitamins, flavoring or the like.

It is already known that sugar can be made by a process wherein any of the liquors and syrups from a sugar refinery as well as other material such as corn syrup solids, dextrine and dextrose are first evaporated to remove most of the water so that a viscous syrup containing 93 percent or more of solids is obtained. This can be done in conventional candy cooking equipment either at atmospheric pressure or under vacuum and it may be either a batch or a continuous process. After the evaporation step, the concentrated syrup is then transferred to a beating or creaming apparatus which induces rapid crystallization by agitation. During agitation, sufficient heat of crystallization is released to further evaporate the moisture so that a solid, fondantlike product containing less than 1 percent water is obtained. Obviously during this stage it is necessary to remove the water vapor to prevent it from recondensing in the sugar.

The most commonly used beating apparatus is a trough equipped with a shaft to which arms have been attached. Stationary fingers attached to the trough set between the arms make the equipment self-cleaning and improve the agitation. It is also possible to use more than one shaft with the arms on adjacent shafts passing between each other.

This produces a sugar product which contains less than 1 percent water which is essentially a mass of fondant-like agglomerates. This has a rather broad particle size distribution and is unsuited for sale. In order to be a useful article of commerce, a more uniform particle size distribution must be achieved in order to ensure reasonable freedom from caking tendencies and to offer the user grain sizes which function best in his product. The more uniform the particle size, the fewer the points of contact which are available to particles to cement together when exposed to variable atmospheric conditions. Further, consumers expect a uniform product and do not look with favor upon a product having a broad range of particle sizes, particularly one containing a quantity of fines.

Such a product could be obtained merely by screening the fondant material but this would be wasteful since the fines and large particles would not fall within the salable range.

The present invention provides an effective way of utilizing substantially 100 percent of the sugar and producing a product of uniform particle size which is essentially non-hygroscopic.

This is accomplished by providing a screen wherein the product from the beaters or creamers is divided into three fractions. One of these is an intermediate fraction of a desired particle size, the second fraction is too fine for use and a third fraction is too coarse for use. The fine fraction is passed through a pelletizer and cooler and then combined with a coarse or scalped fraction. The combined fractions are then passed through a comminutor and the comminuted product is now returned to the screening operation. Thus the particles which are too small are pelletized and then ground to a proper size while those which are too large are ground to the desired size. Naturally such a grinding operation will again produce some fines but these will be picked up in the process and repelletized so that there is no net loss of sugar materials.

BRIEF DESCRIPTION OF THE DRAWING

The sole FIG. of the drawing is a flow diagram illustrating the process.

DESCRIPTION OF THE PREFERRED EMBODIMENTS

Reference is made to the flow sheet given in the FIG. In accordance with this drawing, a liquor feed 2, as is hereinafter described, is passed to cookers 4, where it is evaporated down to at least 93 percent solids. It is then passed to a beater or creamer 6, as hereinafter described. Optionally the material from the beaters can be passed through saw-roll assembly 8, to reduce particle size and to a dryer 10, although these steps are not essential to the process. The material is then fed into a screen 12, where the product is divided into three fractions. The fraction of the proper size, i.e. an intermediate fraction passes into the product receiver 14.

Particular reference is made to that part of the FIG. enclosed in the dashed line 16. It can be seen that the oversize and undersize from the screening operation both are continuously processed to produce a product in the desired particle range. The scalpings (oversize) are sent directly to the comminuting mill 20 where they are broken down into finer particles yielding about 50 percent in the desired range and the remainder requiring rescreening and re-processing.

The fines are built up into larger particles in pelletizer 18 by being forced through a rotating die under extreme pressure to form pellets which in this case are small cylinders about one-fourth of an inch in diameter and about one-fourth to three-eighth inches long. The pellets are plastic when they emerge and must be allowed to cool whereupon they become quite brittle and are easily comminuted into smaller but usable particles which become part of the product One suitable machine used for pelletizing the fines is of the type manufactured by the California Pellet Mill Company for the purpose of pelletizing feed for animals as well as other materials. The operation consists of uniformly passing the feed material into the interior of a cylindrical die whose walls have been perforated radially with holes equal to the size of pellet desired. Pressure rollers inside the dire force the feed mix through the die holes under extreme pressure. As mentioned above, considerable heat develops due to the compression causing the pellet to be plastic in consistency when it emerges from the die. Adjustable knives or wires are located next to the rotating die to slice off the pellets to the desired length.

The pellets are then cooled, preferably by passing them through a commercial cooling device such as that manufactured by California Pellet Mill Company. Countercurrent air effects the cooling. Pellets emerge from the cooler and are cycled back to the screen for routing to the comminuting mill along with the scalpings. They may also be sent directly to the mill if desired.

In addition to sugar products normally found in a sugar refinery, particularly a cane sugar refinery, other additives such as corn syrup solids and dextrins may be incorporated in the feed stock for conversion to solid granular products. A second approach to incorporating additives is to introduce them after cooking just ahead of the beaters. This is particularly useful where the additives might be heat sensitive or react with the sugar carrier if left too long at high temperatures. This would also apply to flavors and colors. The following non-limiting examples illustrate preferred methods of carrying out the inventions.

EXAMPLE I 1,000 gallons of a liquor having the composition set forth below was cooked at atmospheric pressure to a temperature of 280°–290° F. (138°–143° C.) by passing through a continuous candy cooker.

| Composition of Liquor | |
|---|---|
| Sucrose | 68.5 |
| Invert Sugar | 4.5 |
| Water | 24.0 |
| Ash | 2.0 |
| Non-ascertained | 1.0 |
| Solids Content | 76.0 |

The liquor was thereby concentrated by this operation to a solids content of 93–96 percent. It was introduced into a pre-creaming device consisting of a horizontal trough equipped with rotating arms disposed within it on a shaft which served to induce crystallization because of the agitation and cooling occurring. Once started either by seeding or mechanical agitation crystallization occurred spontaneously and continuously in this device. Heat was given off by the act of crystallization which resulted in considerable water vapor being released. The latter was vented through a duct under suction.

The still soft fondant-like mass was transferred to a second creaming device of the same general design and function as the one just described. Here the beating continued, resulting in particles being developed and further liberation and dissipation of water. The product approached 1 percent in water content at this point and consisted of large agglomerates of sugar particles ranging up to three-fourth of an inch in diameter.

This material was then run between two smooth rollers whose surfaces are continuously cleaned by a third saw tooth roller mounted beneath it. The large agglomerates are thus broken down into smaller particles depending on the spacing between the rollers. However, the product was not sufficiently uniform at this point to be considered finished. The range of particle sizes was too large varying from about 100 mesh to 4 mesh in size. Further sizing was required.

An optional step following the saw rollers was a drying operation which tended to remove additional moisture from the particles.

The material was then passed through a conventional screen, in this case a Rotex, having a U.S. 12 mesh screen on its upper deck and a U.S. 40 mesh screen in the lower deck. Other mesh sizes may also be used such as U.S. 6, 8, 10, 14 and 20 for the coarse screen and 35,50 and 70 for the fine screens as may be desired. Three fractions were thus obtained (1) the plus 12 fraction was considered too coarse and had to be further broken down by passing through a comminuting mill, (2) the −12 + 40 fraction which was the product and (3) the −40 fraction which had to be built up into larger particles or pellets which were then in turn comminuted as in (1).

After screening, the coarse fraction (scalpings) was comminuted in a mill. Suitable mills are typified by those known commercially as the Fitzmill, Urschel Commitrol, and Entoleter. All are well known to those skilled in the art. Their function was to break down a particle into smaller pieces with a minimum production of powder or dust.

The −40 fraction was a mixture of fine granular material and powder which was then fed into a pelletizing mill of the same type as that used for pelletizing animal feed. Pellets roughly cylindrical in shape (one-fourth inch diam. × one-fourth inch long) were produced which initially were plastic due to the high temperature developed by the compression. After passing through a cooler (pellets are cooled by a stream of ambient air), the pellets became brittle and were then comminuted in the same mill as used on the scalpings.

Conversion of the scalpings and fines into usable material represented by the mid fraction from the screen was accomplished by these two functions of pelletizing and comminuting. The following table gives representative screen tests of materials processed according to the above examples.

SCREEN TESTS OF 97° PURITY (SOLIDS BASIS) MATERIAL PROCESSED AS INDICATED

| | | Comminuted material | | |
|---|---|---|---|---|
| | Scalpings | Urschel Mill | Fitzmill | Entoleter |
| U.S. Sieve No.: | | | | |
| 10 | 27.1 | 4.7 | .4 | 14.0 |
| 14 | 33.2 | 18.9 | 11.3 | 18.6 |
| 20 | 34.6 | 35.1 | 34.2 | 21.8 |
| 30 | 2.1 | 10.7 | 13.2 | 10.3 |
| 40 | 1.1 | 7.1 | 8.5 | 7.5 |
| 50 | .8 | 6.7 | 8.0 | 6.9 |
| Pan | 1.1 | 16.8 | 24.4 | 20.9 |

| | Pellets | Urschel Mill | Fitzmill | Entoleter |
|---|---|---|---|---|
| U.S. Sieve No.: | | | | |
| 10 | 75.0 | 5.0 | .6 | 2.2 |
| 14 | 8.5 | 11.4 | 7.1 | 11.6 |
| 20 | 5.4 | 24.4 | 31.1 | 10.9 |
| 30 | 3.3 | 14.2 | 17.7 | 12.4 |
| 40 | 2.0 | 10.5 | 11.6 | 12.2 |
| 50 | 1.2 | 9.2 | 9.6 | 9.4 |
| Pan | 4.6 | 25.3 | 22.3 | 41.3 |

EXAMPLE II

The same quantities, conditions, and operations were followed as described in Example 1, with the exception that the composition of the starting liquor was as indicated:

| Sucrose | 65.0% |
|---|---|
| Water | 35.0% |

In the succeeding examples, the term sugar denotes a range of cane sugar refinery in-process materials varying in composition on a dry basis from pure sucrose on the one hand to one with the approximate composition of dark brown sugar. They can be specified as ranging in purity from 100 to 85 percent sucrose.

EXAMPLE III

The same as Example I with the exceptions that solutions containing sugar, dextrines and water as indicated in the following table were substituted and the temperatures reached in cooking were as shown:

| | Case I | Case II |
|---|---|---|
| Sugar (100 to 85 purity) | 49.0 | 59.5 |
| Dextrines | 21.0 | 10.5 |
| Water | 30.0 | 30.0 |
| Temp. of cook | 260°F. | 285°F. |

EXAMPLE IV

The same as Example I with the exception that sugar, dextrose hydrate and water were substituted as the starting material in the following proportions:

| Sugar | 59.5 |
|---|---|
| Dextrose Hydrate | 10.5 |
| Water | 30.0 |
| Temperature | 328°F. |

EXAMPLE V

The same as Example I with substituted exception that sugar, corn syrup solids, and water were subsitutied in the following proportions:

| | Case I | Case II |
|---|---|---|
| Sugar | 49.0 | 49.0 |
| Corn Syrup Solids | 21.0 | 21.0 |
| (DE of corn syrup) | (24) | (42) |
| Water | 30.0 | 30.0 |
| Temp. of Cook | 285°F. | 285°F. |

EXAMPLE VI

The same as Example I with the exception that sugar, mineral phosphates, and water were substituted in the following proportions:

|  | Case I | Case II | Case III |
|---|---|---|---|
| Identity of Phosphate | Sodium dihydrogen ortho-phosphate (NaH$_2$PO$_4$) | Sodium monohydrogen orthophosphate (Na$_2$HPO$_4$) | Sodium ortho-phosphate (Na$_3$PO$_4$) |
| Sugar | 60.0 | 60.0 | 60.0 |
| Phosphate | 10.0 | 10.0 | 10.0 |
| Water | 30.0 | 30.0 | 30.0 |
| Temp. of Cook | 285°F. | 285°F. | 285°F. |
| Pressure | Atmos. | Atmos. | Atmos. |

We claim:

1. In the making of a sugar material wherein a predominantly sugar syrup is concentrated by heating and crystallized by agitation to produce a crystallized sugar containing about 1 percent moisture, the improvement comprising the steps of:
   a. screening the thus crystallized sugar material to produce three fractions namely, fines, scalpings and an intermediate fraction,
   b. pelletizing solely the fines, the pelletizing being done solely by forcing the substantially dry sugar mass through a die under extreme pressure whereby the sugar becomes plastic,
   c. cooling the thus pelletized material whereupon it becomes brittle,
   d. combining the pelletized fines and the scalpings,
   e. comminuting the mixture thus produced,
   f. returning the comminuted material to stop (a), and
   g. recovering the intermediate fraction as product.

* * * * *